May 29, 1956     H. J. McDERMOTT     2,747,913
SUCTION CAKE REMOVING TOOL
Filed March 31, 1953
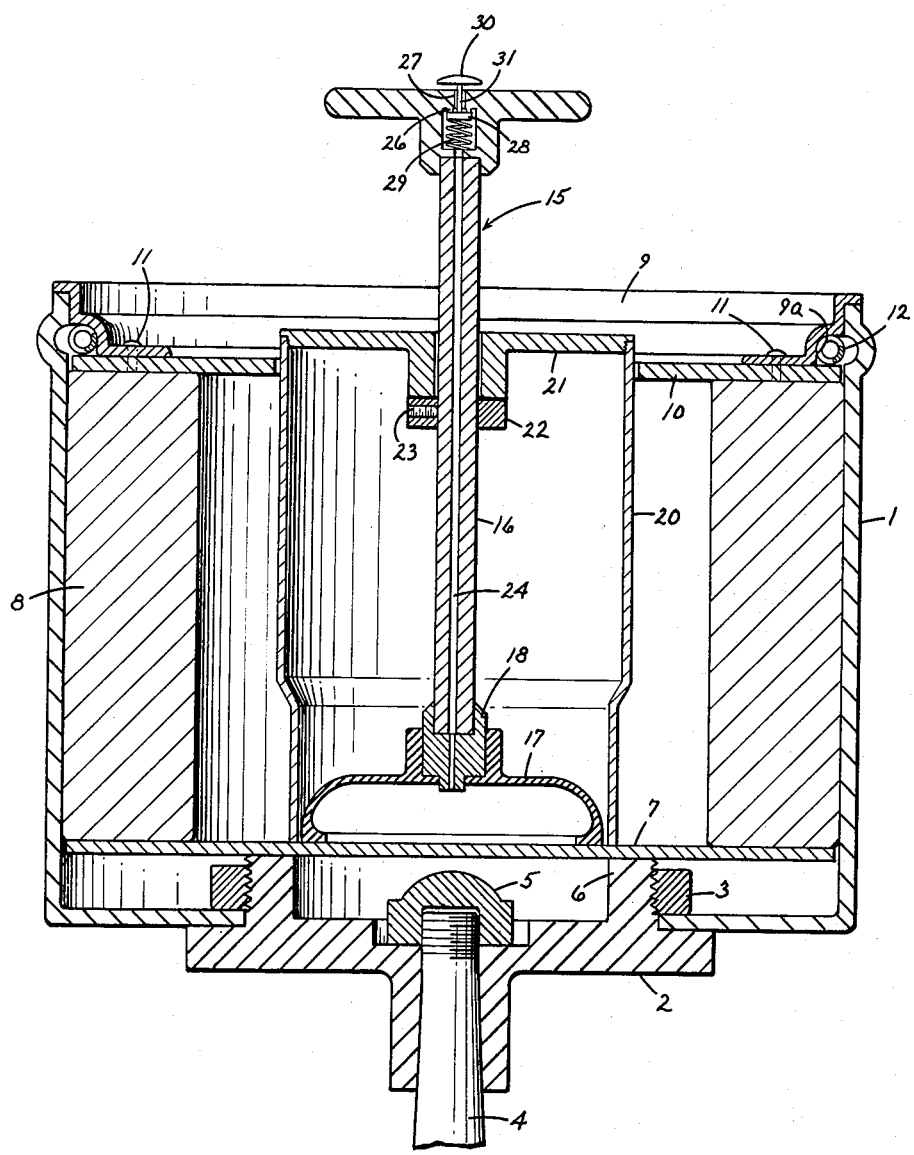

United States Patent Office 2,747,913
Patented May 29, 1956

2,747,913
SUCTION CAKE REMOVING TOOL

Henry J. McDermott, Collingdale, Pa., assignor to American Viscose Corporation, Philadelphia, Pa., a corporation of Delaware Application March 31, 1953, Serial No. 346,000

3 Claims. (Cl. 294—64)

This invention relates to means for removing cakes or packages of spun textile yarn from spinning buckets, and more particularly to the provision of means for releasing the suction from the tool after the cake has been removed from the bucket.

A disadvantage of suction-type cake removing tools has been the difficulty in disconnecting or breaking the suction between the cake lifter and the member to which this lifter or tool is attached by suction. Usually this member is a false bottom in the spinning bucket.

The present invention has for its primary object the provision of a finger-operated valve in the handle of the cake lifter which provides communication with the interior of the suction cup through a bore in the shank of the lifter; and when this valve is opened by finger pressure, the suction in the cup is released so that the cake lifter is readily detached from the bottom.

A further object of the invention is to provide a spring-loaded vent in the handle of a suction-type cake lifter for facilitating the attachment and detachment of the cake lifter with the false bottom of a spinning bucket.

Further objects should be apparent in the specification and drawing which shows a transverse section through a spinning bucket and my improved cake lifter.

The invention comprises essentially provision of an air passage through the shank of a suction-type cake lifter and a spring-loaded vent or release valve in or near the handle of the cake lifting tool which can be opened by slight pressure of the operator's hand or finger to provide atmospheric communication to the interior of a suction cup secured to the opposite end of the shank. Suction-type cake removing tools are well-known in the art and have the disadvantage that when the cake is removed from the bucket there is difficulty or at least annoyance and inconvenience in detaching the suction cup of the lifter from the false bottom of the bucket. This detaching operation prior to the adoption of the present invention necessitates the use of both of the operator's hands with consequent loss of time. Furthermore, the incorporation of the present invention greatly facilitates the reinstallation of the false bottom in the spinning bucket.

Referring now more particularly to the drawing, a conventional spinning bucket 1 is shown mounted on a coupling 2 and retained thereon by means of an internally threaded collar 3. The coupling 2 is attached to a tapered drive shaft or spindle 4 by means of a nut 5. An annular flange 6 on the coupling to which collar 3 is threaded extends upwardly beyond the collar and forms a base for supporting the false bottom 7 of the bucket. The cake of yarn 8 is spun in the bucket and rests on the false bottom 7 in the conventional manner. The lid 9 for the bucket is of two-piece construction and has an annular radially facing groove 9a which is formed partly in the lid and partly by an annular plate 10 secured to the lid by any convenient means, such as rivets 11, 11. A centrifugal latch 12 is retained in the groove 9a so that the collar is securely locked on the top of the bucket when operating at normal speed.

After the cake 8 has been fully formed or spun in the bucket, the apparatus is stopped and a cake lifter or removing tool 15 is inserted into the bore of member 10 so that the false bottom together with the cake and the lid are lifted out of the bucket. In the stationary position, the spring latch 12 is in the retracted position shown in the drawing so that the lid 9 is free to be lifted from the bucket together with the cake and the false bottom 7. The cake lifter assembly 15 comprises an elongated shank 16 to which a resilient suction cup 17 is attached at one end through a coupling 18. The other end of shank 16 is provided with a handle 19 and a cylindrical sleeve 20 is slidably mounted on shank 16 by means of plate 21 so that the cake lifter can be accurately inserted and positioned in the bucket.

Relative movement of the sleeve 20 with respect to shank 16 is limited by a collar 22 secured to the shank by a set screw 23 in such a position that the sleeve will not slide all the way down to coupling 18.

Both the shank 16 and the coupling 18 are provided with a bore or passage 24 which extends completely therethrough from the inside of cup 17 to an enlarged recess 25 in handle 19. The upper part of recess 25 forms an annular valve seat 26 which surrounds a passage 27 providing atmospheric communication with the inside of the suction cup 17 through recess 25 in bore 24. A valve 28 is spring-loaded against valve seat 26 by means of helical compression spring 29 and the valve may be unseated by pressure on the button 30 which is secured to valve stem 31 extending through passage 27. With valve 28 unseated the operator inserts the cake lifter into the bucket as shown and slight additional pressure on handle 19 depresses the suction cup 17 to force air out of the cup through the bores 24 and 27. Depending upon the stiffness of the suction cup 17 it may, of course, not be essential to depress the valve 28 to release the air from the cup since in some cases it is entirely possible to force the air out between the edge of the cup and the false bottom. By releasing button 30, the suction cup 17 holds the false bottom 7 so that it together with the cake 8 and lid assembly 9 can be readily lifted from the bucket 1. When the cake has thus been removed from the bucket the operator depresses valve 26 which immediately breaks the suction in cup 17 permitting the cake lifter to be separated from the false bottom 7 without inconvenience or damage to the cake which is sometimes caused by efforts to shake the valve lifter loose from the bottom.

It will thus be understood that I have provided a simple and effective means which greatly facilitates the attaching and detaching of a suction-type cake lifter and which saves time and reduces the possibility of damage to the yarn cake.

Having thus described my invention, I claim:

1. A cake lifter for removing yarn cakes from spinning buckets having false bottoms comprising an elongated shank, a suction member secured to one end of said shank, a handle secured to the opposite end of said shank, walls defining a bore in the shank providing fluid communication between the atmosphere and the interior of the suction cup, a manually operable spring-loaded valve for selectively opening and closing said bore, means adjacent the handle for actuating said valve, and a sleeve mounted on said shank between the handle and the suction member and enclosing the suction member.

2. Apparatus in accordance with claim 1 in which the sleeve is slidably secured to the shank by means of an adjustable collar.

3. Apparatus in accordance with claim 2 in which the handle is T-shaped and the valve is locked in the handle.

References Cited in the file of this patent

UNITED STATES PATENTS 2,280,658     Miller _____ Apr. 21, 1942

FOREIGN PATENTS 833,847     Germany _____ Feb. 7, 1952